US010350549B2

(12) United States Patent
Shimura et al.

(10) Patent No.: US 10,350,549 B2
(45) Date of Patent: Jul. 16, 2019

(54) HOLLOW FIBER MEMBRANE MODULE AND METHOD FOR MANUFACTURING HOLLOW FIBER MEMBRANE MODULE

(71) Applicant: TORAY INDUSTRIES, INC., Tokyo (JP)

(72) Inventors: Shun Shimura, Otsu (JP); Atsushi Kobayashi, Otsu (JP); Norihiro Takeuchi, Otsu (JP); Yoshiki Okamoto, Otsu (JP)

(73) Assignee: Toray Industries, Inc., Tokyo (JP)

( * ) Notice: Subject to any disclaimer, the term of this patent is extended or adjusted under 35 U.S.C. 154(b) by 294 days.

(21) Appl. No.: 15/507,522

(22) PCT Filed: Sep. 1, 2015

(86) PCT No.: PCT/JP2015/074894
§ 371 (c)(1),
(2) Date: Feb. 28, 2017

(87) PCT Pub. No.: WO2016/035798
PCT Pub. Date: Mar. 10, 2016

(65) Prior Publication Data
US 2017/0291145 A1 Oct. 12, 2017

(30) Foreign Application Priority Data

Sep. 1, 2014 (JP) ................................ 2014-177422

(51) Int. Cl.
*B01D 35/00* (2006.01)
*B01D 63/04* (2006.01)
(Continued)

(52) U.S. Cl.
CPC ........... *B01D 63/04* (2013.01); *B01D 65/022* (2013.01); *B01D 69/08* (2013.01); *B01D 2313/44* (2013.01); *B01D 2321/00* (2013.01)

(58) Field of Classification Search
CPC ... B01D 2201/30; B01D 35/99; B01D 35/301
(Continued)

(56) References Cited

U.S. PATENT DOCUMENTS

| 4,775,471 A | 10/1988 | Nagai et al. |
| 4,929,259 A * | 5/1990 | Caskey ................. B01D 53/22 |
| | | 210/321.81 |
| 2011/0031180 A1 | 2/2011 | Tada et al. |

FOREIGN PATENT DOCUMENTS

| JP | H01151801 U | 10/1989 |
| JP | 09220446 A | 8/1997 |

(Continued)

OTHER PUBLICATIONS

International Search Report and Written Opinion for International Application No. PCT/JP2015/054094, dated Apr. 14, 2015—7 Pages.
(Continued)

*Primary Examiner* — Allison G Fitzsimmons
(74) *Attorney, Agent, or Firm* — RatnerPrestia

(57) ABSTRACT

A hollow-fiber membrane module of the invention includes: a cylindrical case having a first end and a second end in a height direction thereof; a hollow-fiber membrane bundle being housed in the cylindrical case and having a plurality of hollow-fiber membranes each closed at an end part on the first end side and opened at an end part on the second end side; a first binding part binding the end parts on the first end side of the hollow-fiber membranes; a first flow channel guiding fluid to pass through the first binding part from the first end side to the second end side of the first binding part; and a channel material directing, at a terminal on the second end side of the first flow channel, a flow of at least a part of the fluid flowing out from the terminal on the second end side of the first flow channel toward a direction intersecting the height direction of the cylindrical case.

9 Claims, 11 Drawing Sheets

(51) Int. Cl.
B01D 69/08 (2006.01)
B01D 65/02 (2006.01)

(58) Field of Classification Search
USPC .................................................. 210/500.23
See application file for complete search history.

(56) References Cited

FOREIGN PATENT DOCUMENTS

| | | |
|---|---|---|
| JP | 10212999 A | 8/1998 |
| JP | 2005034762 A | 2/2005 |
| JP | 2005262206 A | 9/2005 |
| JP | 2007185593 A | 7/2007 |
| JP | 2008010205 A | 1/2008 |
| JP | 2008095615 A | 4/2008 |
| JP | 4112950 B2 | 7/2008 |
| JP | 2010064046 A | 3/2010 |
| WO | 2014128851 A1 | 2/2017 |

OTHER PUBLICATIONS

Chinese Office Action for Chinese Application No. 201580046910.6, dated Oct. 24, 2018, with translation, 13 pages.
Extended European Search Report for European Application No. 15837714.3, dated Oct. 13, 2017, 7 pages.
Notification of Reasons for Refusal for Japanese Application No. 2015-547580, dated Mar. 5, 2019, with translation, 6 pages.

* cited by examiner

HOLLOW FIBER MEMBRANE MODULE AND METHOD FOR MANUFACTURING HOLLOW FIBER MEMBRANE MODULE

CROSS REFERENCE TO RELATED APPLICATIONS

This is the U.S. National Phase application of PCT International Application No. PCT/JP2015/074894, filed Sep. 1, 2015 and claims priority to Japanese Patent Application No. 2014-177422, filed Sep. 1, 2014, the disclosures of these applications being incorporated herein by reference in their entireties for all purposes.

FIELD OF THE INVENTION

The present invention relates to a hollow-fiber membrane module for use in the fields of water treatment, fermentation industry, medicines/medical treatments, food industry, etc. More specifically, the present invention relates to a hollow-fiber membrane module capable of suppressing accumulation of a suspended substance in the vicinity of a binding part of the hollow-fiber membrane module, and a production method thereof.

BACKGROUND OF THE INVENTION

In general, a hollow-fiber membrane module has a configuration where a hollow-fiber membrane bundle obtained by bundling approximately hundreds to tens of thousands of hollow-fiber membranes is housed in a cylindrical case and at least one end of the hollow-fiber membrane bundle housed in the cylindrical case is bound.

For example, Patent Document 1 discloses a module in which a hollow-fiber membrane bundle is bonded and bound at both ends and a plurality of through holes are provided in one binding part, and this through hole plays the role of, e.g., a supply port for liquid to be filtrated or a cleaning liquid, a port for supplying air at the time of cleaning, and a discharge port for a suspended substance.

PATENT DOCUMENT

Patent Document 1: JP-A-9-220446

SUMMARY OF THE INVENTION

However, on the top surface of the binding part, the space between respective through holes is likely to create a stagnation zone at a low flow velocity in both a case where fluid flows from the bottom and a case where fluid flows from the top. A suspended substance, etc. contained in liquid to be filtrated is readily accumulated in the stagnation zone and when accumulation of a suspended substance is repeated, the suspended substance not only widely covers the hollow-fiber membrane surface but also is solidified into a large lump and cannot be easily removed. As a result, the transmembrane pressure rises due to decrease in the filtration area of the hollow-fiber membrane, or a part of the solidified suspended substance clogs a through hole to cause, e.g., a disproportionate supply of liquid to be filtrated, a cleaning liquid or air, leading to performance degradation of the hollow-fiber membrane module.

Furthermore, in the fields of fermentation industry and medicines/medical treatments, liquid to be filtrated or filtrated liquid must be prevented from contamination, and in the case of using the hollow-fiber membrane module in such fields, an operation of disinfecting or sterilizing the inside of the hollow-fiber membrane module is performed before use. A general disinfection or sterilization method includes hot water disinfection, dry heat sterilization, boiling sterilization, steam sterilization, ultraviolet sterilization, gamma ray sterilization, gas sterilization, and other methods. Particularly, in the case of disinfecting or sterilizing a large tank, a pipeline connected to the tank, or a separation membrane module, hot water disinfection (usually at 80° C. for 1 hour) or steam sterilization (usually at 121° C. for 20 minutes) is a most effective method. However, in the disinfection or sterilization operation, when the number of bacteria before the operation is large due to accumulation, etc. of a suspended substance, the number of remaining bacteria after the operation may be increased, leading to contamination. Among others, in performing steam sterilization, a through hole may fulfill the role of a steam drain discharge port, but if steam drains accumulate in the stagnation zone between respective through holes above the binding part, sufficient heating is not achieved and contamination is caused.

The present invention has been made by taking into account these problems and aims at providing a hollow-fiber membrane module in which flow stagnation above the binding part is reduced and accumulation of a suspended substance is less likely to occur, and providing a production method thereof.

In order to solve the above-mentioned problems, one aspect of the present invention provides the following techniques (1) to (11).

(1) A hollow-fiber membrane module including: a cylindrical case having a first end and a second end in a height direction thereof; a hollow-fiber membrane bundle being housed in the cylindrical case and having a plurality of hollow-fiber membranes each closed at an end part on the first end side and opened at an end part on the second end side; a first binding part binding the end parts on the first end side of the hollow-fiber membranes; a first flow channel guiding fluid to pass through the first binding part from the first end side to the second end side of the first binding part; and a channel material directing, at a terminal on the second end side of the first flow channel, a flow of at least a part of the fluid flowing out from the terminal on the second end side of the first flow channel toward a direction intersecting the height direction of the cylindrical case.

(2) The hollow-fiber membrane module according to (1), in which: at least one of the channel materials is provided to protrude from an end face on the second end side of the first binding part and has an opening part in contact with a surface on the second end side of the first binding part.

(3) The hollow-fiber membrane module according to claim 2, in which: a length of the opening part in the height direction of the at least one of the channel materials is from 1 mm to 30 mm.

(4) The hollow-fiber membrane module according to claim 2 or 3, in which: an outer diameter R of the first binding part and a total area S of the opening parts of the channel materials satisfy $0.004 \le S/R^2 \le 1.2$.

(5) The hollow-fiber membrane module according to any one of (1) to (4), in which: a breaking force F of the hollow-fiber membrane satisfies $F \ge 4.9$ N.

(6) The hollow-fiber membrane module according to any one of (1) to (5), in which: the end face on the second end side of the first binding part has an A hardness of 10 or more and a D hardness of less than 85.

(7) The hollow-fiber membrane module according to any one of (1) to (6), in which: the terminal of at least one of the first flow channels is arranged in an area within a height of 3 mm from the lowest region in the end face on the second end side of the first binding part.

(8) The hollow-fiber membrane module according to any one of (1) to (7), in which: a total area of the first flow channels in a cross-section perpendicular to the height direction is from 2 to 35% relative to an area on an inner side of the cylindrical case in the cross-section perpendicular to the height direction, including the first binding part.

(9) The hollow-fiber membrane module according to any one of (1) to (8), in which: the hollow-fiber membrane module has a plurality of the first flow channels, the channel material is arranged to change a flow direction of the fluid flowing out from a part of flow channels among the plurality of the first flow channels, and in the cross-section perpendicular to the height direction, an area of, among the first flow channels, a flow channel supplying a flow in a direction to be changed by the channel material is from 30 to 90% relative to the total area of the first flow channels.

(10) A method for producing the hollow-fiber membrane module according to any one of (1) to (9), the method including the following steps (a) to (e):

(a) a step of disposing the channel material at least at one end part of the hollow-fiber membrane bundle having the plurality of hollow-fiber membranes;

(b) a step of disposing a flow channel-forming jig in a portion to be a flow channel of the channel material;

(c) a step of disposing a potting jig to surround at least the end part on which the channel material is arranged, of the hollow-fiber membrane bundle having the plurality of hollow-fiber membranes;

(d) a step of curing a potting agent in the potting jig to form a binding part in which bonding/fixing between the hollow-fiber membranes and of the channel material is completed; and (e) a step of removing the flow channel-forming jig and the potting jig.

(11) A method for producing the hollow-fiber membrane module according to any one of (1) to (9), the method including the following steps (a) to (d):

(a) a step of disposing a potting jig to surround at least one end part of the hollow-fiber membrane bundle having the plurality of hollow-fiber membranes;

(b) a step of curing a potting agent in the potting jig to form a binding part in which bonding/fixing between the hollow-fiber membranes is completed;

(c) a step of removing the potting jig; and (d) a step of fixing the channel material to the binding part.

The hollow-fiber membrane module according to one embodiment of the present invention includes a hollow-fiber membrane, a first binding part in which the first end side of the hollow-fiber membrane is closed and bound, a first flow channel guiding fluid to pass the first binding part from the first end side to the second end side, and a channel material directing the flow of at least a part of the fluid flowing out from the terminal on the second end side of the first flow channel toward a direction intersecting the height direction of the cylindrical case housing a hollow-fiber membrane bundle. The direction of flow, which is fixed in the first flow channel, can be changed by the channel material, so that the stagnation zone between respective first flow channels above the first binding part can be reduced.

BRIEF DESCRIPTION OF THE DRAWINGS

FIG. 5(*a*) shows a baffle-like channel material, FIG. 5(*b*) shows a spherical channel material, FIG. 5(*c*) shows a channel material having a planar tip, and FIG. 5(*d*) shows a channel material having a dome-shaped tip.

FIG. 8(*a*) is a diagrammatic sectional view of the channel material and the first binding part, FIG. 8(*b*) is a schematic top view of the channel material and the first binding part, and FIG. 8(*c*) is an enlarged view of the channel material.

DETAILED DESCRIPTION OF EMBODIMENTS OF THE INVENTION

Figure 1:
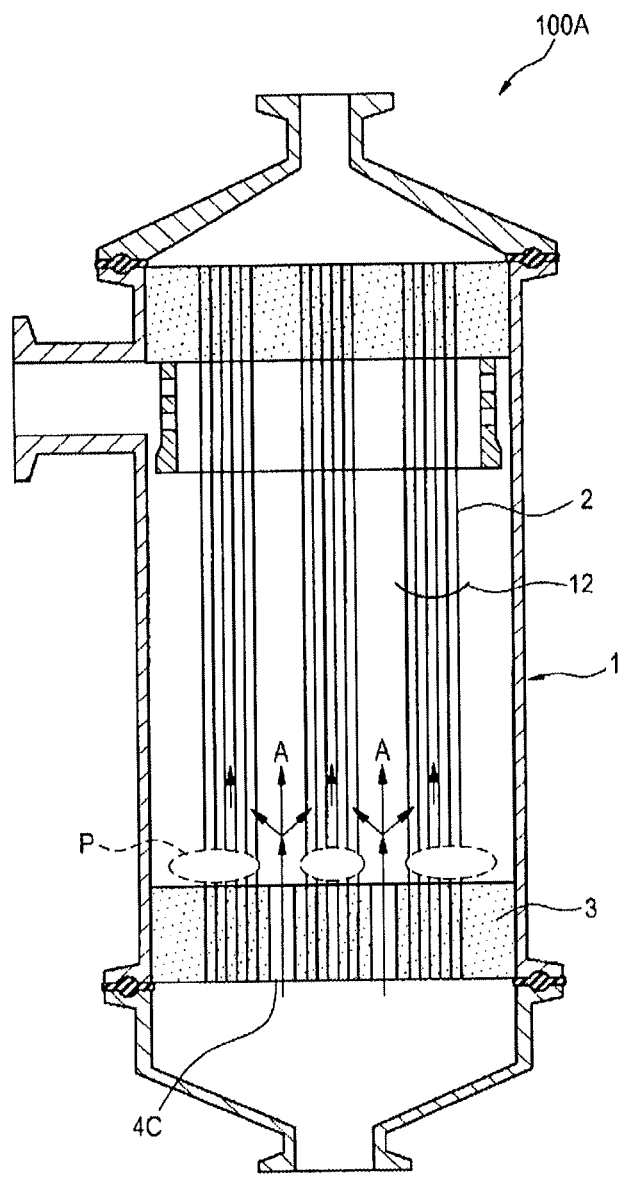
FIG. 1 is a diagrammatic sectional view of the hollow-fiber membrane module 100 A according to conventional technique, schematically illustrating the flow from bottom to top of fluid inside the module.

The mode of the hollow-fiber membrane module of one embodiment of the present invention is described in detail below based on the drawings. Here, in the hollow-fiber membrane module of the present invention, the terms "top" and "bottom" are based on the state illustrated in the figure and used in an expedient manner; the side where liquid to be filtrated flows in is referred to as the "bottom" direction; and the side where filtrated liquid flows out is referred to as the "top" direction. The direction from "bottom" to "top" is expressed as the "height direction" for the sake of convenience. Usually, in a posture of the hollow-fiber membrane module in use, the top-to-bottom direction coincides with the top-to-bottom direction in the drawing. In the present invention, the direction of flow channel does not necessarily coincide with the height direction (the direction perpendicular to the diameter direction of the cylindrical case). It is sufficient if the opening part of the flow channel is provided in the surface on the first end side of the binding part and in the surface on the second end side. In other words, the flow channel may be provided obliquely relative to the height direction.

I. Embodiment

I-1. Hollow-Fiber Membrane Module
(1) Outline of Module Configuration

Figure 3:
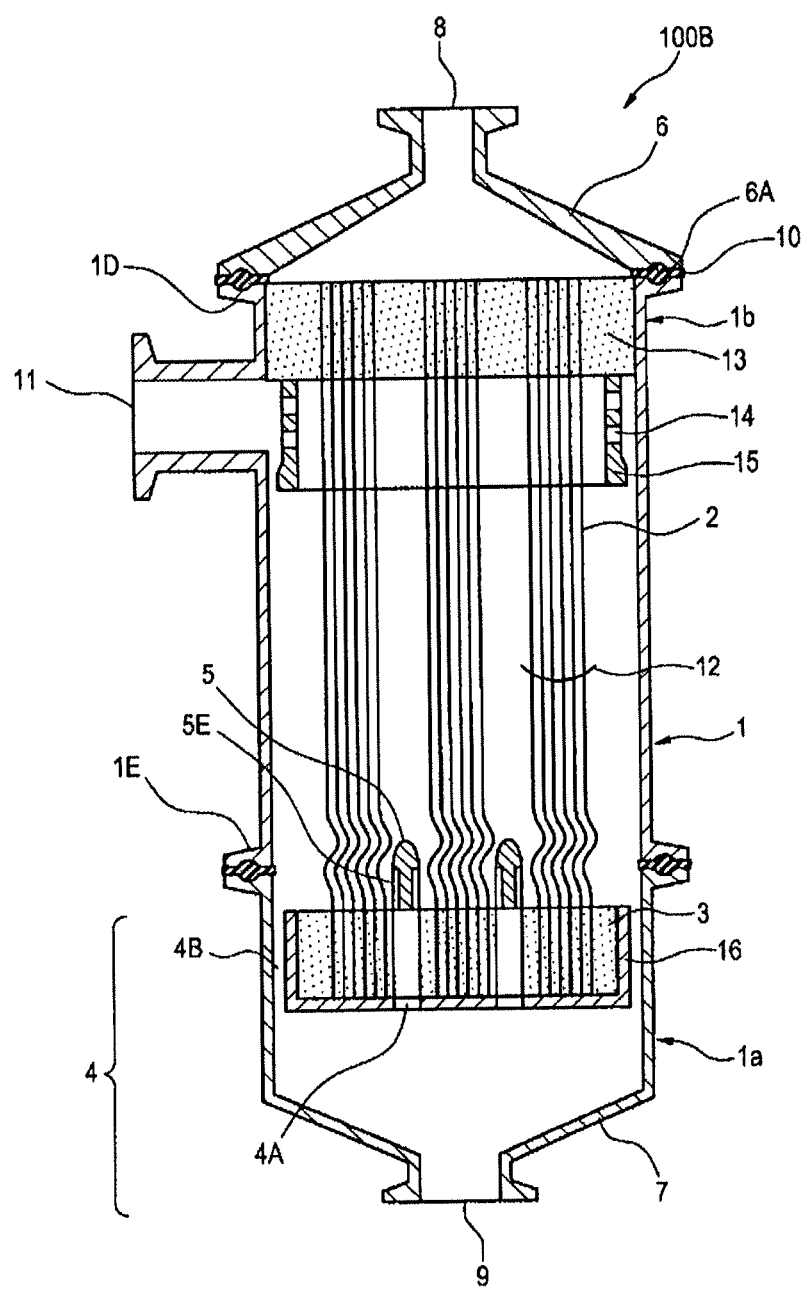
FIG. 3 is a diagrammatic sectional view of the hollow-fiber membrane module 100B according to the first embodiment of the present invention.

The configuration of the hollow-fiber membrane module according to an embodiment of the present invention is described by referring to the drawings. FIG. 3 is a diagrammatic vertical sectional view of the hollow-fiber membrane module 100B according to the first embodiment of the present invention.

The hollow-fiber membrane module 100B according to the first embodiment includes a cylindrical case 1 having a first end 1a and a second end 1b in the height direction, a hollow-fiber membrane bundle 12 being housed in the cylindrical case 1 and having a plurality of hollow-fiber membranes 2 each closed at the end part on the first end 1a side (first end part) and opened at the end part on the second end side 1b (second end part), a first binding part 3 binding the end parts on the first end 1a side of the hollow-fiber membranes 2, a first flow channel 4 guiding fluid to pass through the first binding part 3 from the first end 1a side to the second end 1b side, and a channel material 5 directing the flow of at least a part of the fluid flowing out from the terminal on the second end 1b side of the first flow channel 4 toward the diameter direction of the cylindrical case 1.

The cylindrical case 1 is constituted of a hollow cylindrical case 1, and an upper cap 6 and a lower cap 7 provided in both end parts of the cylindrical case 1.

As illustrated in FIG. 3, an upper cap 6 having a filtrated liquid outlet 8 and a lower cap 7 having a liquid-to-be-filtrated inflow port 9 are liquid-tightly and airtightly connected respectively to the upper part of the cylindrical case 1 and the lower part of the cylindrical case 1. The upper cap 6 and the lower cap 7 are, for example, as illustrated in FIG. 3, fixed to the cylindrical case 1 with a clump, etc. by using a gasket 10.

The cylindrical case 1 has, in the upper end and the lower end, flanges 1D and 1E running throughout the whole circumference of the cylindrical case 1. A liquid-to-be-filtrated outlet 11 as a nozzle for discharging fluid (liquid to be filtrated) is provided on a side surface nearer to the filtrated liquid outlet 8, i.e., nearer to the second end 1b, of the cylindrical case 1.

The upper cap 6 has an inner diameter substantially equal to the inner diameter of the cylindrical case 1, and the upper end side thereof is tapered to form the filtrated liquid outlet 8. The upper cap 6 has, in a lower end side thereof, a stepped part 6A formed over the whole circumference of the upper cap 6 to form a groove when connected to the cylindrical case 1.

The lower cap 7 has an inner diameter substantially equal to the inner diameter of the cylindrical case 1, and the lower end side thereof is tapered to form a liquid-to-be-filtrated inflow port 9.

In addition, the hollow-fiber membrane module 100B includes a hollow-fiber membrane bundle 12 containing a plurality of hollow-fiber membranes 2, and a binding part binding the hollow-fiber membranes 2 to each other at the end part of the hollow-fiber membrane bundle 12. The binding part has a first binding part 3 arranged on the liquid-to-be-filtrated inflow port 9 side of the cylindrical case 1 and a second binding part 13 arranged on the filtrated liquid outlet 8 side of the cylindrical case 1.

Furthermore, the hollow-fiber membrane module 100B includes a flow regulation cylinder 15 being arranged between the cylindrical case 1 and the hollow-fiber membrane bundle 12 to stand in line with the liquid-to-be-filtrated outlet 11 in the diameter direction of the cylindrical case 1 and having a plurality of flow regulation holes 14 on the side surface, and the second binding part 13 is housed in the flow regulation cylinder 15.

(2) First Binding Part

Figure 4:
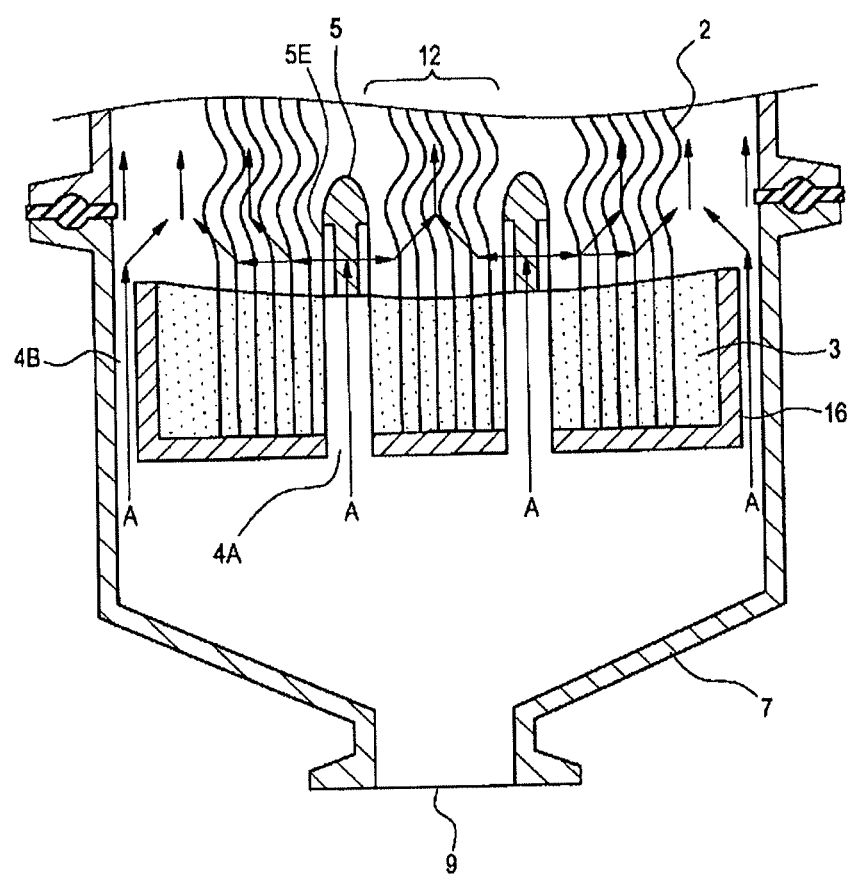
FIG. 4 is an enlarged view of the first binding part of the hollow-fiber membrane module 100B according to the first embodiment of the present invention, schematically illustrating how fluid flows in the first flow channel from bottom to top.
Figure 5A:
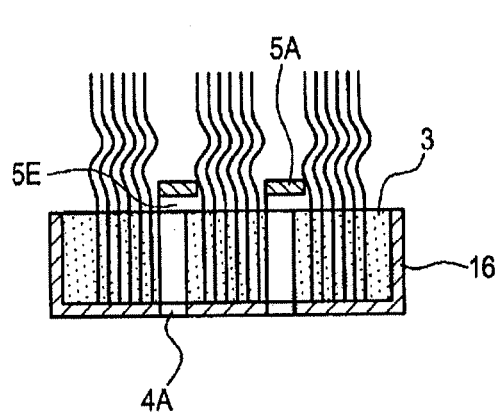
FIG. 5 are views illustrating examples of the shape of the channel material of the present invention.
Figure 5B:
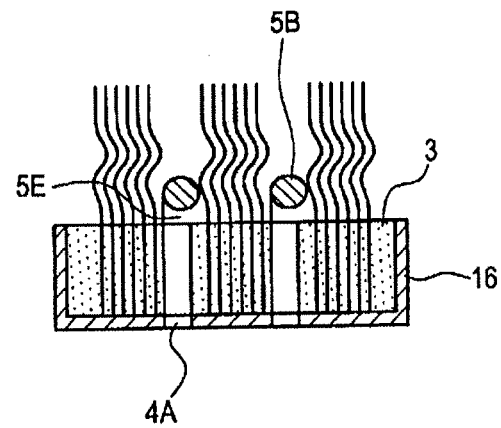
Figure 5C:
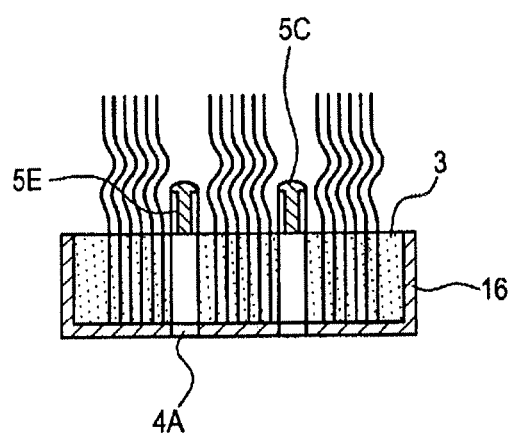
Figure 5D:
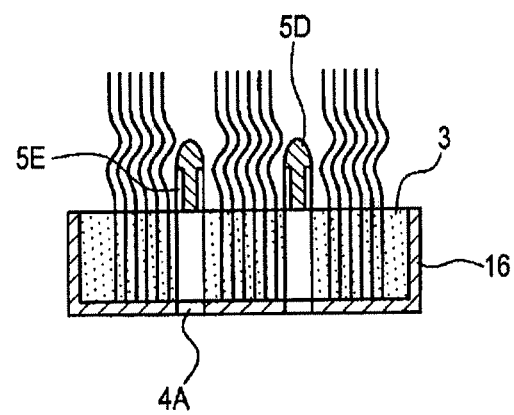

In the first binding part 3 on the liquid-to-be-filtrated inflow port 9 side of the cylindrical case 1, i.e., on the lower end side of the hollow-fiber membrane module 100B, the first end part of the hollow-fiber membrane 2 is bound in the state of closing the hollow part. As illustrated in FIG. 4, in the vicinity of the end face on the second end 1b side of the first binding part 3, fluid (arrow A) having flowed out from the channel material 5 acts as a force in the diameter direction of the cylindrical case 1, on the hollow-fiber membrane 2, and rupture of the hollow-fiber membrane 2 is likely to occur in this portion. Accordingly, in the end face on the second end 1b side of the first binding part 3, a material having low hardness to a certain extent is preferably present as a buffer material around the hollow-fiber membrane 2, and the hardness of the buffer material (the portion in the end face on the second end 1b side of the first binding part 3) is preferably a D hardness of less than 85, more preferably a D hardness of less than 60. If the hardness is too low, breakage, etc. is likely to occur during handling of the hollow-fiber membrane module 100B, and the hardness is preferably an A hardness of 10 or more, more preferably an A hardness of 30 or more. The hardness may be measured using a commercially available hardness meter based on JIS K 6253. The buffer material may be used individually and in this case, only needs to be used in the vicinity of the end face on the second end 1b side of the first binding part 3.

The binding part can serve also as a buffer material by selecting the material of the binding part. The binding method is not particularly limited as long as the mechanical strength, chemical durability, thermal durability, etc. of the binding part are satisfied, but the method includes, for example, a method of covering the outer circumference of the hollow-fiber membrane bundle 12 with a heat-shrinkable tube, etc. and heating it to complete binding, a method of laying the hollow-fiber membranes side-by-side on a sheet and rolling the hollow-fiber membranes in the sheet, and a method of bonding the hollow-fiber membranes by using a potting agent. The potting agent may contain, as a main component, a silicone resin, an epoxy resin, a polyurethane resin, etc. In addition, the potting agent may contain an additive material other than an adhesive, such as silica, glass and rubber.

The first binding part 3 is housed in a cylindrical first binding part case 16 having a bottom part on the lower side. The outer diameter of the first binding part case 16 is configured to be smaller than the inner diameter of the cylindrical case 1. The first binding part case 16 is not necessarily required but is used for the protection of the first binding part 3. The material of the first binding part case 16 is not particularly limited as long as the mechanical strength, chemical durability, thermal durability, etc. are satisfied, but examples of the material thereof include a vinyl chloride-based resin, a polypropylene-based resin, a polysulfone-based resin, a fluororesin such as polytetrafluoroethylene and perfluoroalkoxyfluoro-resin, polycarbonate, polypropylene, polymethylpentene, polyphenyl sulfide, polyether ketone, stainless steel, and aluminum.

The first binding part 3 may be fixed to the cylindrical case 1, and the fixing method has no relevance to the present invention. In addition, the shape of the first binding part case 16 and furthermore, the presence or absence of the first binding part case 16 have no relevance to the present invention.

(3) First Flow Channel

The first binding part 3 has a first flow channel 4 which is to be a flow channel for fluid such as liquid to be filtrated. Specifically, the first flow channel 4 includes, e.g., a through hole 4A provided in the first binding part 3, and a clearance 4B between the cylindrical case 1 and the first binding part 3. For reducing the generation of a flow stagnation zone in the vicinity of the end face on the second end 1b side of the first binding part 3, the total area of the first flow channel 4 in the cross-section perpendicular to the height direction is preferably from 2 to 35% relative to the area on the inner side of the cylindrical case in the cross-section perpendicular to the height direction, including the first binding part. If the area of the first flow channel 4 is small, the space between respective through holes 4A, which can be a stagnation zone, becomes wide and even when a channel material 5 is provided, the effect of reducing stagnation is less likely to be obtained. In addition, a large pressure loss is caused at the time of passing of fluid in the first flow channel 4 and when fluid flows from bottom to top, the pump power cost rises. Furthermore, in the case where fluid flows from top to bottom, the flow is difficult to occur, and a suspended substance may clog the first flow channel. On the other hand, if the area of the first flow channel 4 is large, the cross-sectional area of the portion other than the hollow-fiber membrane 2 in the first binding part 3 decreases, and the hollow-fiber membranes 2 therefore stand close together to cause a problem, for example, that a sealing failure is produced on the first end 1a side of the hollow-fiber membrane 2 or that a suspended substance accumulated between hollow-fiber membranes 2 can be hardly discharged. Furthermore, in the case where fluid flows from bottom to top in the first flow channel 4, if the area of the first flow channel 4 is too large, the pressure loss of the fluid is insufficient, and the flow flowing into the channel material 5 is biased. When the flow flowing into the channel material 5 is biased, the diameter-direction flow flowing out from the channel material 5 is biased to create a large stagnation zone, and a suspended substance tends to accumulate.

The first flow channel 4 preferably contains a plurality of through holes 4A, and respective through holes 4A may be arbitrarily arranged, for example, at the positions of peaks of a number of equilateral triangles, at positions of intersections of a radial line with a concentric circle, or at positions of intersections on a grid, but if the distance between through holes adjacent to each other is biased, stagnation readily occurs in a place where the distance is larger than in other places. Accordingly, arrangement at equal intervals is preferred so as not to make a large difference in the distance.

Furthermore, the terminal of at least one of the first flow channel 4 is preferably arranged in the area within a height of 3 mm from the lowest region in the end face on the second end 1b side of the first binding part 3. In the case where fluid flows from top to bottom (the flow of arrow B in FIG. 6), when the end face on the second end 1b side of the first binding part 3 is not horizontal, stagnation is likely to occur in a lowest region, but since the terminal of the first flow channel 4 is arranged in such an area, drainage from a low region can be unfailingly performed.

Figure 6:
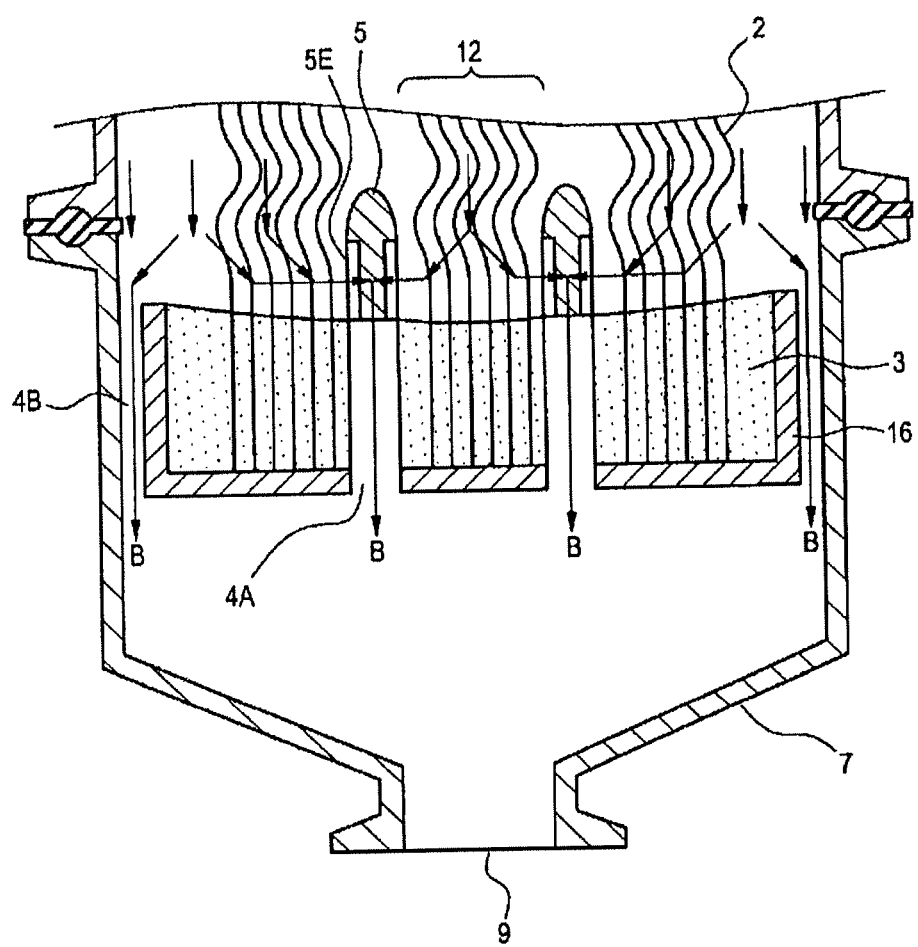
FIG. 6 is an enlarged view of the first binding part of the hollow-fiber membrane module 100B according to the first embodiment of the present invention, schematically illustrating how fluid flows in the first flow channel from top to bottom.

The case where the end face on the second end 1b side of the first binding part 3 is not horizontal includes, for example, the following case. When the first binding part 3 is formed using a potting agent, particularly, when a centrifugal potting method is performed, a recess is created in the central part on the second end 1b side of the first binding part due to the effect of centrifugal force (FIG. 6). In addition, due to the effect of gravity, an inclination is formed between the top direction and the bottom direction at the time of potting. On the other hand, in the static potting method, the end face on the second end 1b side of the first binding part 3 can be made horizontal, but when the potting is performed in the state of the first binding part case 16 being inclined from the vertical direction, an inclination is formed on the end face on the second end 1b side.

The cross-sectional shape of the through hole 4A, perpendicular to the height direction, may be any shape such as circle, ellipse, polygon and star.

(4) Flow Channel Material

It is preferred that the channel material 5 is arranged to change the direction of a flow direction of fluid flowing out from a part of the first flow channels 4 and in the cross-section perpendicular to the height direction, the area of, among the first flow channels 4, a flow channel supplying a flow in a direction to be changed by the channel material 5 is from 30 to 90% relative to the total area of the first flow channels 4. If the area of a first flow channel 4 supplying a flow in a direction to be changed by the channel material 5 is too large, when fluid flows from bottom to top in the channel material 5, an excessive pressure loss may be caused, and furthermore, when fluid flows from top to bottom in the channel material 5, a flow is less likely to occur, leaving a possibility of insufficient drainage. On the other hand, if the area of a flow channel supplying a flow in a direction to be changed by the channel material 5 is too small, when fluid flows from bottom to top in the first flow channel 4, a flow not passing through the channel material 5 becomes preferential, and the effect of reducing the stagnation zone by the channel material 5 is not sufficiently obtained.

The shape of the channel material 5 is not particularly limited as long as the outflow direction of fluid flowing from bottom to top in the first flow channel 4 can be changed, but examples of the channel material include a baffle-like channel material 5A depicted in FIG. 5(*a*), a spherical channel material 5B depicted in FIG. 5(*b*), a channel material 5C having a planar tip depicted in FIG. 5(*c*), and a channel material 5D having a dome-shaped tip depicted in FIG. 5(*d*). The method for fixing the channel material 5 is not particularly limited as long as sufficient mechanical strength is obtained, but examples of the method include a method of fixing the channel material to the first binding part 3, a method of fixing the scaffold of the channel material 5 to the wall part of the through hole 4A, a method of fixing the channel material to the first binding part case 16, and a method of fixing the channel material to the inner wall of the cylindrical case 1. The channel material 5 and the first binding part case 16 may be previously manufactured as one member. If the outer wall of the channel material 5 has a sharp portion, a burr, etc., the hollow-fiber membrane 2 may be damaged, and liquid to be filtrated may leak to the filtrated liquid side. Accordingly, the outer wall of the channel member 5 is preferably smooth. Taking these into account, in this embodiment, a channel material 5 having a dome-shaped tip (5D) is illustrated in each Figure, but the shape of the channel material 5 of the present invention is not limited thereto.

In the case where fluid flows from top to bottom, the driving force for allowing fluid to flow down is sometimes only the own weight of the fluid and therefore, the space that can work out to a stagnation zone is preferably minimized. As schematically illustrated in FIG. 6, flows of many of fluids flowed down from top to bottom by their own weight within the module are blocked by the end face on the second end 1b side of the first binding part 3, and the direction of flow is changed toward the channel material 5 or the first flow channel 4. Accordingly, the channel material 5 has an opening part 5E serving both as a flow channel for fluid flowing from the first end 1a side to the second end 1b side and as a flow channel for fluid flowing from the second end 1b side to the first end 1a side. The opening part 5E is preferably put into contact with the surface on the second end 1b side of the first binding part 3. The opening part 5E is put into contact with the surface on the second end 1b side of the first binding part 3, whereby a fluid flow can be generated near the surface on the second end 1b side of the first binding part 3, in which a suspended substance is likely to accumulate. Furthermore, in the opening part 5E of the channel material 5, the width of the portion in contact with the surface on the second end 1b side of the first binding part 3 is preferably 1 mm or more. If the width is less than 1 mm, drainage takes a long time, or sufficient drainage cannot be performed because, for example, the opening part is clogged by a suspended substance contained in the liquid.

The length of the opening part 5E in the height direction of the channel material 5 is preferably from 1 mm to 30 mm, more preferably from 5 mm to 20 mm. In the case where fluid flows into the channel material 5 from bottom, when the length of the opening part 5E in the height direction is 1 mm or more, the pressure loss can be suppressed, and the module can thereby be operated without requiring a large pump power cost. In addition, clogging by a suspended substance, etc., or clogging due to production error is less likely to occur. On the other hand, when the length of the opening part 5E in the height direction is 30 mm or less, the proportion of a diameter-direction component in the flows flowing out from the channel member 5 can be kept relatively large, and the effect of reducing the place susceptible to accumulation of a suspended substance, etc. (stagnation zone) is more increased.

Figure 7:
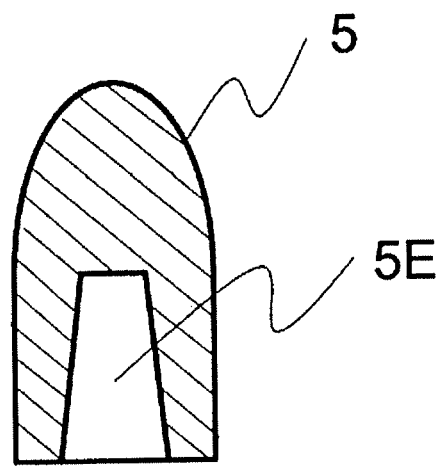
FIG. 7 is a view illustrating one example of the opening part shape of the channel material of the present invention.

As illustrated in FIG. 7, the width of the opening part 5E of the channel material 5 can be configured to be larger as the position is lower in the height direction and be gradually decreased toward the top. The vicinity of the surface on the second end 1b side of the first binding part 3 is a place in which a suspended substance is most likely to accumulate, but since the opening part has such a shape, the proportion of a diameter-direction component in the flow becomes large in this place, so that the accumulation amount of a suspended substance can be reduced.

Figure 8A:
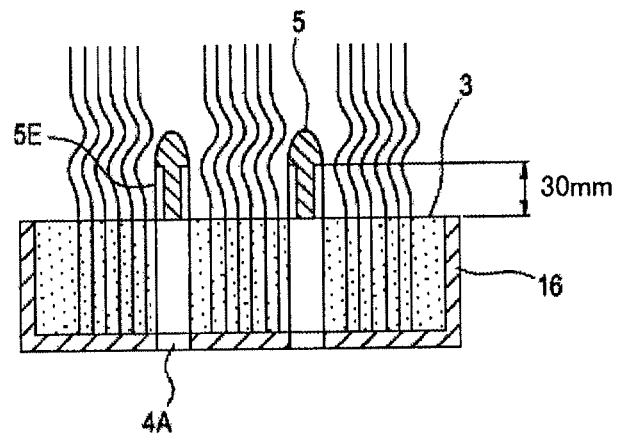
FIG. 8 are views illustrating an example of the arrangement of the channel material of the present invention.
Figure 8B:
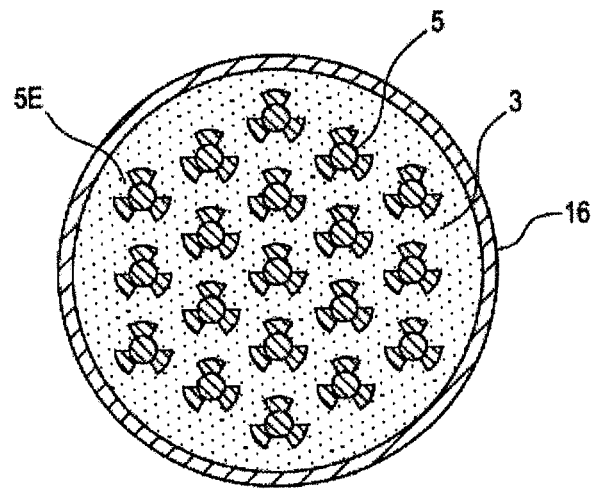

The arrangement (i.e., number, position and orientation) of the channel material 5 is not particularly limited. However, the arrangement of the channel material 5 is preferably set such that each of the hollow-fiber membranes 2 located in a space within a height of 30 mm from the end face on the second end 1b side of the first binding part 3 is put into contact with fluid flowing out via the opening part 5E of at least one channel material 5. FIGS. 8(a) and 8(b) illustrate examples of such a configuration.

As illustrated in FIG. 8(a), the channel material 5 is open between the upper end surface of the binding part 3 and the height of 30 mm.

In FIG. 8(b), each channel member 5 is arranged such that fluid from the channel material 5 reaches the range to which fluid flowing out from other channel materials 5 can hardly reach. Specifically, in a visual field from above of the binding part 3, the opening part 5E of a certain channel material 5 faces the non-opening part (i.e., a portion that is not the opening part 5E) of a channel material 5 in the vicinity thereof. The channel material 5 is arranged in this way, whereby all hollow-fiber membranes 2 can receive the flow of fluid flowing out via the opening part 5E of the channel material 5.

The total area S of the opening parts 5E of the channel materials 5 and the outer diameter R on the second end 1b side of the first binding part 3 preferably satisfy $0.004 \leq S/R^2 \leq 1.2$, more preferably satisfy $0.01 \leq S/R^2 \leq 0.86$.

When the $S/R^2$ value is 0.004 or more, the flow flowing out via the opening part 5E of the channel material 5 can be made uniform. As a result, the flow flowing out via the opening part 5E of the channel material 5 reaches most of the hollow-fiber membranes 2 near the end face on the second end 1b side of the first binding part 3 and cleans the membrane surface. Furthermore, generation of a localized excessively strong flow from the opening part 5E of the channel material 5 is suppressed, and a trouble, for example, that the hollow-fiber membrane 2 is subject to a force higher than the strength of the membrane itself and damaged, is less likely to occur. When the $S/R^2$ value is 1.2 or less, the flow velocity of the flow flowing out via the opening part 5E of the channel material 5 can be sufficiently increased, and the place in which a suspended substance, etc. is likely to accumulate can be reduced as well.

Figure 9:
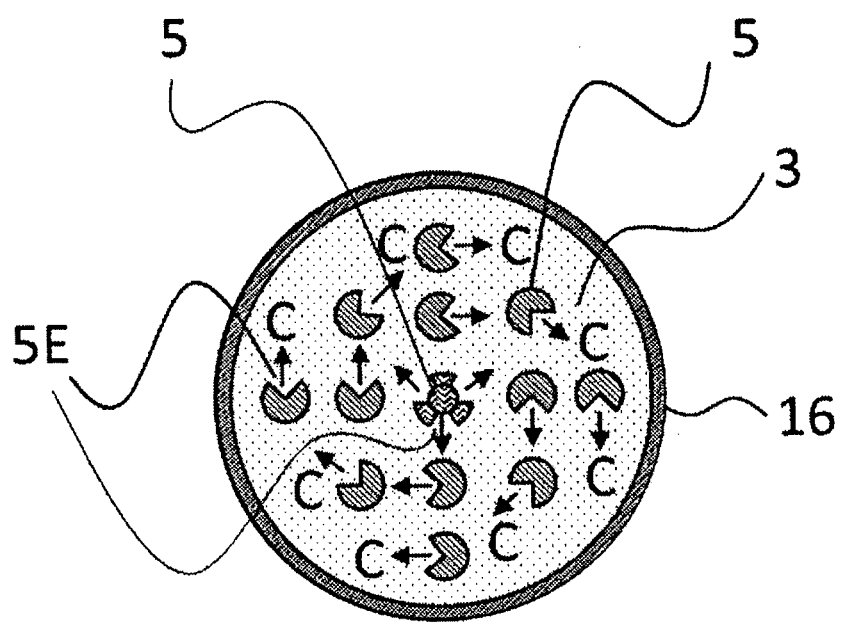
FIG. 9 is a schematic top view of the channel material and the first binding part, illustrating an example of the arrangement of the channel material of the present invention.

The opening parts 5E of respective channel materials 5 may be evenly provided on the surface perpendicular to the height direction of the channel material 5 but may be unevenly distributed in arbitrary directions. As illustrated in FIG. 9, the opening parts 5E may be unevenly distributed and arranged by changing, among respective channel material 5, the direction having a larger area of the opening part 5E to thereby control the flow in the hollow-fiber membrane module 100B and cause, for example, a swirling flow as denoted by arrow C in FIG. 9.

Figure 8C:
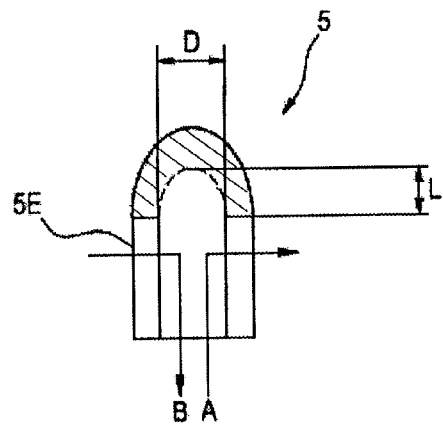

In the case where, as illustrated in FIG. 8(c), the channel material 5 is a channel material 5 having a dome-shaped tip (5D), the depth L of the dead end surrounded by the inner wall of the channel material 5, which is above the opening part 5E arranged highest up in the channel material 5, and the equivalent-circle diameter D of the dead end preferably satisfy $L/D \leq 5.0$. The equivalent-circle diameter as used herein indicates the diameter of a circle when the shape of the cross-section perpendicular to the height direction is converted into a round shape having the same area. The dead-end space formed deep inside the channel material 5 becomes a stagnation zone and tends to be subject to accumulation of a suspended substance and occurrence of disinfection and sterilization failures at the time of hot water disinfection or steam sterilization. In this regard, when $L/D \leq 5.0$ is satisfied, the shape inside the channel material 5 can be made to be a shape in which the dead-end space formed deep inside the channel material is small, and the efficiency of disinfection and sterilization can be enhanced.

(5) Hollow-Fiber Membrane

The hollow-fiber membrane module 100B of this embodiment includes a hollow-fiber membrane 2 as the separation membrane. Hundreds to tens of thousands of hollow-fiber membranes 2 are bundled to form a hollow-fiber membrane bundle 12. The hollow-fiber membrane 2 is advantageous in that the membrane generally has a larger specific surface area than a flat sheet membrane and the amount of liquid which can be filtrated therewith per unit time period is large. As for the structure of the hollow-fiber membrane 2, there are present, for example, a symmetric membrane in which the pore diameter is uniform as a whole, an asymmetric membrane in which the pore diameter changes in the membrane thickness direction, and a composite membrane having a support layer for retaining the strength and a separation functional layer for separating a target substance.

The average pore diameter of the hollow-fiber membrane 2 may be appropriately selected according to the separation target. In the case of aiming at separation, etc. of microorganisms such as bacteria and funguses, or animal cells, the average pore diameter is preferably from 10 nm to 220 nm. If the average pore diameter is less than 10 nm, the water permeability may decrease, and if the average pore diameter exceeds 220 nm, microorganisms, etc. may leak out. The "average pore diameter" as used in the present invention indicates the pore diameter of a dense layer having a smallest pore diameter.

The material of the separation membrane is not particularly limited, but the separation membrane may contain, for example, a fluororesin such as polytetrafluoroethylene, polyvinylidene fluoride, polyvinyl fluoride, a tetrafluoroethylene/hexafluoropropylene copolymer and an ethylene/tetrafluoroethylene copolymer; a cellulose ester such as cellulose acetate, cellulose acetate propionate and cellulose acetate butyrate; a polysulfone-based resin such as polysulfone and polyether sulfone; or a resin such as polyacrylonitrile, polyimide and polypropylene. In particular, a separation membrane formed of a fluororesin or a polysulfone-based resin is high in heat resistance, physical strength and chemical durability and can therefore be suitably used for a hollow-fiber membrane module in the fields requiring steam sterilization or hot water disinfection, such as fermentation industry, production of medicines, food industry and water treatment.

As described above, the total area S of the opening parts 5E of the channel materials 5 and the outer diameter R on the second end 1b side of the first binding part 3 preferably satisfy $0.004 \leq S/R^2 \leq 1.2$, more preferably satisfy $0.01 \leq S/R^2 \leq 0.86$. When the total area S and the outer diameter R satisfy this range, a flow for reducing the place susceptible to accumulation of a suspended substance (stagnation zone) can be effectively generated in the hollow-fiber membrane module 100B without large deviation. On the other hand, the hollow-fiber membrane may be damaged by a flow via the opening part 5E. In order to operate the hollow-fiber membrane module 100B in the range above without damaging the hollow-fiber membrane 2, the hollow-fiber membrane 2 preferably has high strength. Specifically, the force per membrane (breaking force) is preferably 4.9 N or more, more preferably 5.9 N or more, still more preferably 7.8 N or more. As for the breaking force (N), a separation membrane wetted with water is measured with a measurement length of 50 mm and a full-scale load of 5 kg at a crosshead speed of 50 mm/min by using a tensile tester (TENSILON (registered trademark)/RTM-100, manufactured by Toyo Baldwin Co., Ltd.). The measurement is repeated 10 times by changing the sample, and the measured values are number-averaged to determine the force (N).

The hollow-fiber membrane 2 may further contain a hydrophilic resin, in addition to a fluororesin or a polysulfone-based resin. The hydrophilic resin can increase the hydrophilicity of the separation membrane and enhance the water permeability of the membrane. The hydrophilic resin may be sufficient if it is a resin capable of imparting hydrophilicity to the separation membrane, and the resin is not limited to a specific compound but, for example, a cellulose ester, a fatty acid vinyl ester, vinylpyrrolidone, ethylene oxide, propylene oxide, a polymethacrylic acid ester-based resin, and a polyacrylic acid ester-based resin are suitably used.

At the time of preparation of the hollow-fiber membrane module 100B, a potting agent is sometimes used for binding hollow-fiber membranes 2. In this case, hollow-fiber membranes are packed in a jig for forming a potting part and fixed by a potting agent, and the hollow-fiber membranes 2 have been previously dried because of the problem in terms of handling or adhesion. However, many hollow-fiber membranes 2 have a problem that contraction occurs due to drying and the water permeability is reduced. For this reason, a hollow-fiber membrane that has been immersed in an aqueous glycerin solution and then dried, is used. When the hollow-fiber membrane is dried after immersion in an aqueous glycerin solution, the glycerin remains in pores, making it possible to prevent contraction due to drying, and the water permeability can be recovered by thereafter performing an immersion treatment with a solvent such as ethanol.

The hollow-fiber membrane module 100B may be used after subjecting it to steam sterilization or hot water disinfection but depending on the kind of the hollow-fiber membrane 2, contraction is sometimes caused by steam sterilization and hot water disinfection. Accordingly, if steam sterilization or hot water disinfection is performed after preparation of the module, the hollow-fiber membrane 2 may be damaged due to contraction of the hollow-fiber membrane 2, or the hollow-fiber membrane 2 may fall off from the binding part. It is therefore preferable to previously contract the hollow-fiber membrane 2 by performing a treatment with steam or hot water and then prepare the module by binding the end parts thereof. Since the steam sterilization is generally conducted at 121° C. or more, it is preferred that a pretreatment with steam at 121° C. or more has been conducted. In addition, the hot water disinfection is generally conducted at about 80° C., but since the temperature is often changed according to the process, it is preferred that the hollow-fiber membrane has been previously treated with hot water at a temperature not less than the assumed use temperature.

In the hollow-fiber membrane module 100B, the sum of areas of the hollow-fiber membranes 2 and the hollow parts of the hollow-fiber membranes 2 in the cross-section perpendicular to the height direction is preferably from 35 to 65% relative to the area of the end face on the second end 1b side of the first binding part 3. If the proportion of the area of the hollow-fiber membranes 2 is small, the filtration throughput per unit volume of the hollow-fiber membrane module is decreased, and the cost per capacity of filtration increases. If the proportion of the area of the hollow-fiber membranes 2 is large, the diameter-direction flow flowing out from the channel material 5 is blocked, and the effect of reducing stagnation is not sufficiently obtained, or it is difficult to arrange the channel material.

From the viewpoint of workability at the preparation of the hollow-fiber membrane module 100B or cleanability of the hollow-fiber membrane 2 at the time of module cleaning, the hollow-fiber membrane bundle 12 is preferably housed in the cylindrical case 1 through the intermediary of binding parts 3 and 13 on both sides in the state of being kept loosened. The "loosened" indicates the state where the length of the hollow-fiber membrane 2 from the end face on the second end 1b side of the first binding part 3 to the end face on the first end 1a side of the second binding part 13 is longer than the linear distance of that portion.

(6) Second Binding Part

On the second end 1b side of the cylindrical case 1, a second binding part 13 that is the upper end side of the hollow-fiber membrane module 100B is arranged. The second binding part 13 is constituted by binding a hollow-fiber membrane bundle 12 including a number of hollow-fiber membranes 2. Here, the hollow part of the hollow-fiber membrane 2 is not sealed but in the opened state, and filtrated liquid is taken out from the opening part to the upper cap 6 side. The binding method and the material used are not particularly limited as long as the mechanical strength, chemical durability, thermal durability, etc. of the binding part are satisfied, but, for example, the same method and material as those for the first binding part 3 may be selected.

The outer diameter of the second binding part 13 is configured to be smaller than that of the cylindrical case 1. Furthermore, a flow regulation cylinder 15 is present between the cylindrical case 1 and the second binding part, the second binding part 13 is fixed to the cylindrical case 1 or the flow regulation cylinder 15, and the flow regulation cylinder 15 is fixed to the cylindrical case. The method for fixing each member has no relevance to the present invention.

(7) Materials of Cylindrical Case and Flow Regulation Cylinder

The material of the cylindrical case 1 used in the hollow-fiber membrane module 100B is not particularly limited as long as the mechanical strength, chemical durability, thermal durability, etc. are satisfied, but examples of the material thereof include a vinyl chloride-based resin, a polypropylene-based resin, a polysulfone-based resin, a fluororesin such as polytetrafluoroethylene and perfluoroalkoxyfluororesin, polycarbonate, polypropylene, polymethylpentene, polyphenyl sulfide, polyether ketone, stainless steel, and aluminum. The material of the flow regulation cylinder 15 used in the hollow-fiber membrane module 100B is not particularly limited but may be selected, for example, from the same materials of the cylindrical case 1.

I-2. Production Method of Hollow-Fiber Membrane Module

The production method of the hollow-fiber membrane module according to this embodiment is described below. The production method described herein is not limited to the first embodiment, but in any of the later-described embodiments, the hollow-fiber membrane module can be produced by the same method.

The method for manufacturing the first binding part 3 and the second binding part 13 by using a potting agent is described below. As the potting method, either a centrifugal potting method where a liquid potting agent is caused to penetrate between hollow-fiber membranes by utilizing centrifugal force and then cured, or a static potting method where a liquid potting agent is delivered from a metering pump or a head and flowed naturally to penetrate between hollow-fiber membranes 2 and is then cured, may be used.

In the centrifugal potting method, the potting agent is likely to penetrate between hollow-fiber membranes by centrifugal force, and a high-viscosity potting agent is also usable. In the case of using a polyurethane resin as the potting agent for bonding hollow-fiber membranes 2, water contained in the hollow-fiber membrane 2 reacts with isocyanate to generate carbon dioxide to cause bubbles, and therefore, a polyurethane resin can be hardly used in the static potting method. In the centrifugal potting method, the centrifugal force produces a pressure in the direction of the end part of the module and air bubbles are expelled inwardly, so that a polyurethane resin can be used as the potting agent for bonding the hollow-fiber membranes 2. On the other hand, the static potting method does not require large equipment such as centrifugal molding machine.

After potting is finished and the potting agent is cured, a potting part on the second end 1b side of the second binding part is cut to open the end face of the hollow-fiber membranes 2. Before performing the potting, it is preferable to conduct a filling treatment for sealing the hollow part in the end part on the second end 1b side of the hollow-fiber membrane 2 with a silicone adhesive, etc. The filling treatment can prevent the potting agent from further entering into the hollow part, thereby preventing the occurrence of an impassable fiber in which the hollow part is filled with the potting agent to block filtrated liquid.

In performing the potting, the surface on the inner side of the first binding part case 16 may be subjected to filing, a plasma treatment, a primer treatment, etc. to improve the adhesion. The same applies to the case of bonding the second binding part on the inner side of the flow regulation cylinder 15.

Figure 10:
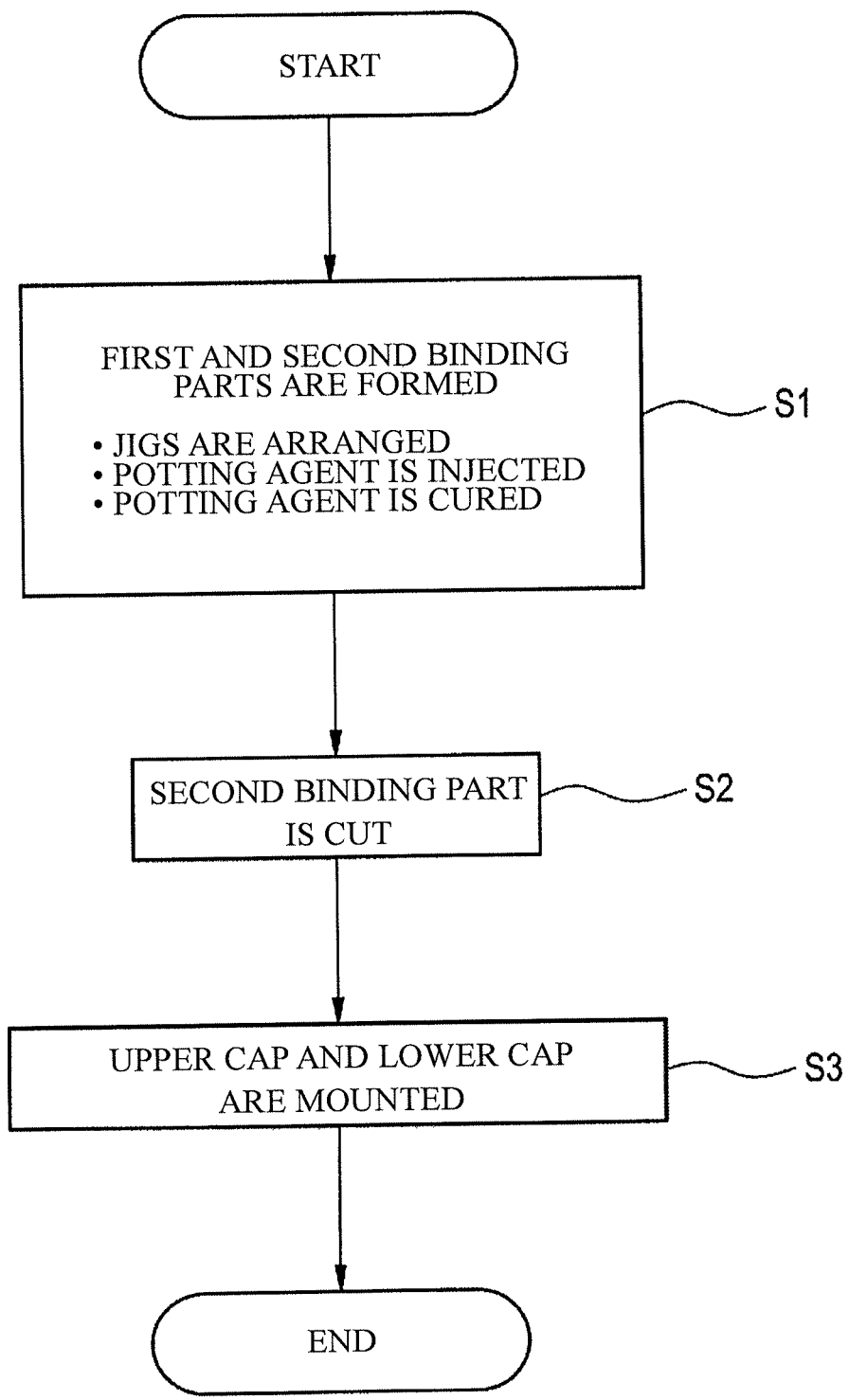
FIG. 10 is a flowchart illustrating one example of the production method of the hollow-fiber membrane module 100B according to the first embodiment of the present invention.

The production method of the hollow-fiber membrane module 100 according to the first embodiment is described below by referring to the flowchart of FIG. 10. It should be noted that the production method described below can be applied to modules in any of the late-described embodiments.

Figure 11:
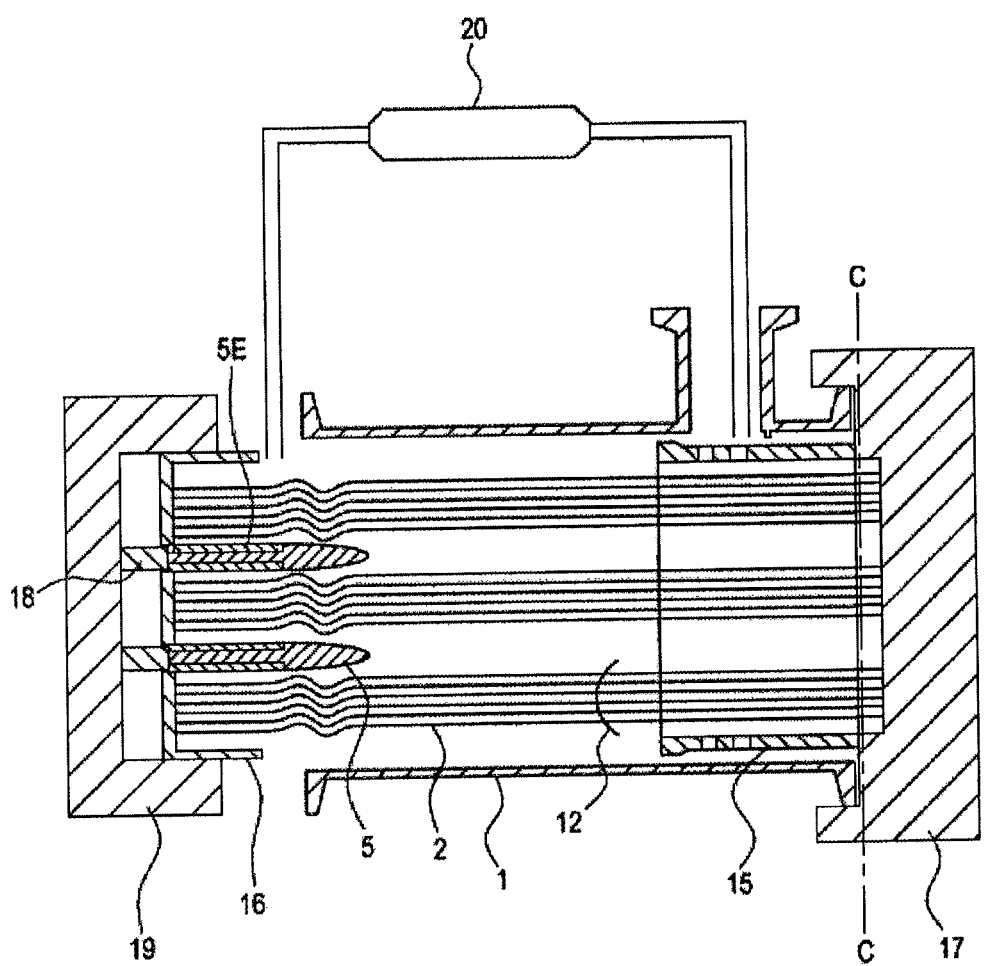
FIG. 11 is a view for explaining one example of the production method of the hollow-fiber membrane module 100B according to the first embodiment of the present invention.

First, the hollow-fiber membrane bundle 12 is placed in the centrifugal potting apparatus illustrated in FIG. 11, and centrifugal potting is performed to form the first binding part and the second binding part (step S1).

The hollow-fiber membrane bundle 12 is housed in a cylindrical case 1, and the first end part of the hollow-fiber membrane 2, the second end part of the hollow-fiber membrane 2, and the flow regulation cylinder 15 are inserted into a first binding part case 16, a flow regulation cylinder 15, and a jig 17 for forming the second binding part, respectively. A pin 18 fitting the channel material 5 to the outer circumference thereof is inserted into a through hole at the bottom of the first binding part case 16, and the first binding part case 16, a channel material 5 having a dome-shaped tip (5D) and the pin 18 are housed inside a jig 19 for forming the first binding part. The second end part of the hollow-fiber membranes 2 is previously subjected to a filling treatment with a silicone adhesive.

A potting agent feeder 20 is connected to the cylindrical case 1, and the whole apparatus is rotated in a centrifugal molding machine, whereby the potting agent can be supplied by centrifugal force to the first binding part case 16 and the jig 17 for forming the second binding part. Here, the potting agent can be supplied to the first binding part case 16 and the jig 17 for forming the second binding part, simultaneously or separately.

After the potting agent is cured, the binding part-forming jigs 17 and 19 and the pin 18 are removed. At this time, as illustrated in FIG. 11, an opening part extending to a portion to be filled up with the potting agent is previously provided in the channel material 5, whereby an opening part in contact with the end face on the second end 1b side of the first binding part can be formed after removing the pin 18. The time and temperature required for curing vary depending on the kind of the potting agent, and suitable conditions may therefore be appropriately applied.

In this method, although the channel member 5 is fixed to the first binding part 3 simultaneously with the formation of the first binding part 3, it may also be possible to previously form the first binding part 3 and thereafter fix the channel material 5 to the first binding part 3. In the case of protruding the channel material 5 toward the second end side of the first binding part, for example, the length in the height direction, for which the channel material 5 protrudes, and the orientation of the opening part 5E may be adjusted by taking into account the formed shape of the first binding part. In addition, when the channel material 5 is removably fixed to the first binding part 3, the shape or position of the channel material 5 can be adjusted after the operational evaluation of the hollow-fiber membrane module.

The C-C portion of FIG. 11 is cut by a tip saw-type rotary blade to open the second end part of the follow-fiber membrane 2 (step S2).

Finally, a lower cap 7 and an upper cap 6 are fixed respectively to the first end 1a side and the second end 1b side of the cylindrical case 1, whereby the hollow-fiber membrane module 100B can be produced (step S3).

The material of the binding part-forming jig is not particularly limited as long as the heat resistance, chemical durability, etc. are satisfied, but, for example, a vinyl chloride-based resin, a nylon-based resin, a fluororesin, a polypropylene-based resin, a polyacetal-based resin, a polyethylene-based resin, and a silicone-based resin have excellent release properties and are suitably used. For the potting part-forming jig, a single material may be used, or a plurality of materials combined to contain at least one of the above-described materials may be used. The material of the pin is also not particularly limited as long as the heat resistance, chemical durability, etc. are satisfied, but, for example, the same material as that of the binding part-forming jig may be used. In the case of using a metal, for example, a fluororesin coating is preferably applied so as to enhance the release properties.

I-3. Method for Operating Module

During a filtration operation using the hollow-fiber membrane module 100B, liquid to be filtrated enters via the liquid-to-be-filtrated inflow port 9, passes through the first flow channel 4 from bottom to top from the first end 1a side of the first binding part 3 and after the flow direction is changed to the diameter direction by the channel material 5, flows out (the flow of arrow A in FIG. 4). The liquid to be filtrated proceeds by changing the course to the height direction after having proceeded to a certain extent. After passing through the hollow-fiber membrane 2, the liquid to be filtrated moves as filtrated liquid to a space surrounded by the second binding part 13 and the upper cap 6. Thereafter, the filtrated liquid is taken out from the module via the filtrated liquid outlet 8.

In the case of performing dead-end filtration, the liquid-to-be-filtrated outlet 11 is closed.

On the other hand, in the case of performing cross-flow filtration, a part of liquid to be filtrated introduced into the cylindrical case 1 is taken out from the liquid-to-be-filtrated outlet 11. The liquid to be filtrated taken out is again introduced into the module via the liquid-to-be-filtrated inflow port 9. In the cross-flow filtration, since a flow is created in the module, an effect of cleaning the membrane surface by a flow near the membrane surface is obtained, and accumulation of a suspended substance is reduced. In the cross-flow filtration operation, by increasing the membrane surface linear velocity, a higher shear force can be applied to a suspended substance, etc. attached to the membrane surface.

In general, the membrane surface linear velocity in the cross-flow filtration is from 0.1 to 7 m/s. The membrane surface linear velocity is preferably from 0.3 to 3 m/s, because higher cleanability is maintained and stable operation can thereby be performed for a long period of time.

The cross-flow filtration is widely used particularly in the fields of fermentation industry, medicines/medical treatments and food industry. In addition, a step of cleaning the inside of the module is generally provided after filtration operation is performed using a hollow-fiber membrane module for a predetermined period of time, and water, chemical, gas, etc. are supplied via the liquid-to-be-filtrated inflow port 9. Particularly, in the step requiring hot water disinfection, hot water at about 80° C. or more is supplied.

On the other hand, in the cleaning step, a method where filtrated liquid, water or a cleaning solution is introduced via the filtrated liquid outlet 8 and discharged to the outside through the hollow part of the hollow-fiber membrane 2 may be employed, or at the time of, e.g., steam sterilization of the inside of the module, wastewater flows from top to bottom in the channel material 5 and the first flow channel 4 and discharged to the outside via the liquid-to-be-filtrated inflow port 9.

The present invention is not limited to the embodiments described above, and modifications, improvements, etc. can be appropriately made therein at will. Furthermore, the material, shape, dimension, numerical value, mode, number, arrangement position, etc. of each constituent element in the embodiments described above are arbitrary and not limited as long as the present invention can be achieved.

II. Comparative Mode

The hollow-fiber membrane module 100A illustrated in FIG. 1 includes a cylindrical case 1 having a first end a second end in the height direction, a hollow-fiber membrane bundle 12 being housed in the cylindrical case 1 and having a plurality of hollow-fiber membranes 2 each closed at the end part on the first end side and opened at the end part on the second end side, a first binding part 3 binding the end part on the first end side of the hollow-fiber membrane 2, and a through hole 4C guiding fluid to pass through the first binding part from the first end side to the second end side.

The fluid (arrow A) flows with directivity at the time of passing from bottom to top through the through hole 4C and after exited up from the through hole 4C, proceeds while maintaining the directivity created in passing the through hole 4C though it depends on the flow velocity and the flow resistance in the hollow-fiber membrane bundle portion. The fluid further proceeds to a certain extent and thereafter becomes a uniform flow by losing directivity in association with the change of flow channel from that in the through hole 4C or the flow resistance. Accordingly, the flow velocity between respective through holes 4C immediately after exiting the through hole 4C is very small, and stagnation tends to occur. As a result, a place (stagnation zone) P susceptible to accumulation of a suspended substance, etc. is likely to be generated.

Figure 2:
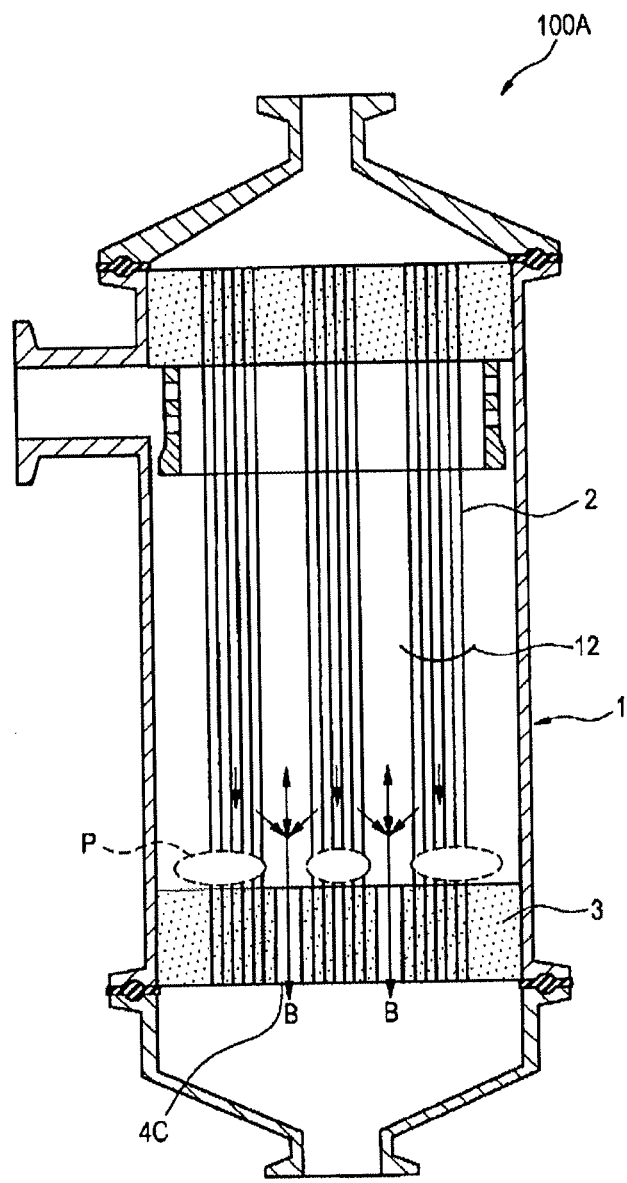
FIG. 2 is a diagrammatic sectional view of the hollow-fiber membrane module 100A according to a conventional technique, schematically illustrating the flow from bottom to top of fluid inside the module.

The hollow-fiber membrane module after a filtration step for a predetermined time is subjected to a step of cleaning a suspended substance, etc. attached to the membrane surface, and at this time, a cleaning drainage such as backwashing water is discharged from the through hole 4C together with a suspended substance. FIG. 2 illustrates how a suspended substance is discharged from the through hole 4C. The cleaning drainage (arrow B) containing a suspended substance flows as a uniform flow from top to the vicinity of the binding part, flows toward each through hole 4C near the binding part, and after flowing to bottom in the through hole 4C, is discharged. At this time, a place (stagnation zone) P susceptible to accumulation of a suspended substance, etc. is likely to be generated between respective through holes 4C.

EXAMPLES

The present invention is described more specifically by referring to Examples, but the present invention is not limited to these Examples.

Example 1

(a) Production of Hollow-Fiber Membrane

38 Parts by mass of a vinylidene fluoride homopolymer having a weight average molecular weight of 417,000 and 62 parts by mass of γ-butyrolactone were mixed and dissolved at 160° C. This polymer solution, accompanied by an aqueous 85 mass % γ-butyrolactone solution as liquid for forming a hollow part, was discharged through a double-pipe spinneret and solidified in a cooling bath being disposed 30 mm below the spinneret and containing an aqueous 85 mass % γ-butyrolactone solution at a temperature of 20° C., to produce a hollow-fiber membrane having a spherical structure. Subsequently, 14 parts by mass of a vinylidene fluoride homopolymer having a weight average molecular weight of 284,000, 1 part by mass of cellulose acetate propionate (CAP482-0.5, produced by Eastman Chemical Company), 77 parts by mass of N-methyl-2-pyrrolidone, 5 parts by mass of polyoxyethylene sorbitan fatty acid ester (Ionet (registered trademark) T-20C, produced by Sanyo Chemical Industries, Ltd.), and 3 parts by mass of water were mixed and dissolved at 95° C. to prepare a polymer solution. This membrane-forming stock solution was applied uniformly onto the surface of the hollow-fiber membrane having a spherical structure and immediately solidified in a water bath to prepare a hollow-fiber membrane 2 in which a three-dimensional network structure was formed on the spherical-structure layer. The obtained hollow-fiber membrane 2 had an outer diameter of 1,010 μm, an inner diameter of 600 μm, and a membrane surface average pore size of 40 nm. The force per membrane was 6.4 N.

(b) Production of Module

The hollow-fiber membrane 2 obtained in (a) above was cut to a length of 1,800 mm, immersed in an aqueous 30 mass % glycerin solution for 1 hour, and then air dried. This hollow-fiber membrane 2 was heat-treated with water vapor at 125° C. for 1 hour, air dried, and cut to a length of 1,200 mm. The second end side of the hollow-fiber membrane 2 was then filled with a silicone adhesive (SH850A/B, produced by Dow Corning Toray Co., Ltd., a mixture of two components in a mass ratio of 50:50).

Thereafter, as illustrated in FIG. 11, 9,000 hollow fiber membranes 2 obtained above were packed in a cylindrical case 1 (inner diameter: 145 mm, outer diameter: 155 mm, length: 1,000 mm). Furthermore, a first binding part case 16 (inner diameter: 138 mm, outer diameter: 140 mm, length: 30 mm), a pin 18, and a jig 19 for forming the first binding part were mounted on the first end 1a side of the cylindrical case 1, and a flow regulation cylinder 15 and a jig 17 for forming the second binding part were mounted on the second end 1b side of the cylindrical case 1. The cylindrical case 1 attached with the jigs in this way was placed in a centrifugal molding machine. The pin 18 fitting a channel material 5 to the outer circumference thereof was inserted into a through hole 4A at the bottom of the first binding part case 16, and the first binding part case 16, the pin 18 and the channel material 5 were housed inside the jig 19 for forming the first binding part. The pin 18 plays the role as a flow channel-forming jig for forming a flow channel in a portion to be a flow channel of the channel material 5.

As the membrane bundle adhesive (potting agent), a bisphenol F type epoxy resin (LST868-R14, produced by Huntsman Japan Co., Ltd.) and an aliphatic amine-based curing agent (LST868-H14, produced by Huntsman Japan Co., Ltd.) were mixed in a mass ratio of 100:30, and a total of 2,000 g (1,000 g per one end) was put in the potting agent feeder 20.

Subsequently, the centrifugal molding machine was rotated to pack the potting agent in the jig 17 for forming the second binding part and the first binding part case 16 on both sides and form the first binding part 3 and the second binding part 13, and the potting agent was cured. The temperature in the centrifugal molding machine was 35° C., the rotational speed was 350 rpm, and the centrifugation time was 5 hours. The jig 17 for forming the second binding part and the first binding part case 16 surround the end part of the hollow-fiber membrane bundle 12 and fulfill the role as a potting jig for curing the potting agent in the inside thereof and forming a binding part.

Thereafter, the binding part-forming jigs 17 and 19 and the pin 18 were removed and after curing at room temperature for 24 hours, the end part (C-C surface illustrated in FIG. 11) of the second binding part 13 was cut by a tip saw-type rotary blade to open the end face of the hollow-fiber membrane 2.

In particular, in this embodiment, all channel materials 5 are a channel material having a dome-shaped tip, the width of the portion of the opening part 5E being put into contact with the surface on the second end 1b side of the first binding part 3 is 5 mm, and the height of the opening part 5E was 1 mm. The opening part 5E was provided in three places at equal intervals in the diameter direction of the channel material. 28 channel materials 5 were arranged per module, and at this time, the total area S of the opening parts 5E of the channel materials 5 and the outer diameter R on the second end 1b side of the first binding part 3 were at $S/R^2=0.022$.

Subsequently, a gasket 10 made of EPDM was mounted on flanges 1D and 1E (see, FIG. 3) of the cylindrical case 1, and an upper cap 6 and a lower cap 7 were attached to fabricate a hollow-fiber membrane module 100B illustrated in FIG. 3. Thereafter, ethanol was delivered to the hollow-fiber membrane module 100B and filtrated to fill pores of the hollow-fiber membrane 2 with ethanol, and RO water was then delivered and filtrated to replace ethanol by RO water.

(c) Filtration Operation Using Hollow-Fiber Membrane Module

Activated sludge obtained by treating factory effluent was adjusted with city water to have an activated sludge amount of 3 g/L, and experimental water to be treated was thereby obtained.

The water to be treated was supplied via the liquid-to-be-filtrated inflow port 9 to the hollow-fiber membrane module 100B obtained in (b) above, discharged via the liquid-to-be-filtrated outlet 11 at a membrane linear velocity of 0.5 m/s, and thereby circulated in the module. The filtrated liquid was taken out from the filtrated liquid outlet 8 at a filtration flow rate of 0.1 $m^3/m^2$/day.

After continuing the filtration operation for 4 weeks, the liquid in the hollow-fiber membrane module 100B was discharged from the liquid-to-be-filtrated inflow port 9, the filtrated liquid outlet 8 and the liquid-to-be-filtrated outlet 11 were opened for 1 week, and the hollow-fiber membrane module 100B was dried by supplying warm air at 80° C. thereinto via the liquid-to-be-filtrated inflow port 9. The weight W0 of the dry hollow-fiber membrane module 100B before the supply of activated sludge and the weight W1 of the dry hollow-fiber membrane module 100B after the supply of activated sludge were measured. The weight difference (W1−W0) of the hollow-fiber membrane module between before and after the supply of activated sludge was calculated.

(d) Steam Sterilization of Hollow-Fiber Membrane Module

Steam at 125° C. was supplied via the liquid-to-be-filtrated outlet 11 to the hollow-fiber membrane module 100B obtained in (b) above and after discharging air in the hollow-fiber membrane module 100B by opening the liquid-to-be-filtrated inflow port 9 under atmosphere pressure for 5 minutes, the tip of the liquid-to-be-filtrated inflow port 9 was changed to a steam trap. A temperature sensor was fixed at 5 places on the end face on the second end 1b side of the first binding part 3, and the temperature transition was measured.

(e) Results

As a result of a filtration operation test, the increase in weight due to supply of activated sludge was as small as 2 g (Table 1). The hollow-fiber membrane module 100B was thereafter disassembled, and the vicinity of the first binding part 3 was observed, as a result, accumulation of a suspended substance was not recognized. This reveals that the hollow-fiber membrane module 100B of this Example caused little stagnation. In addition, a damage, etc. were not recognized in the hollow-fiber membrane 2 when observed, and this reveals that the first binding part 3 and the opening part 5E of the channel material 5 not only have a shape effective to reduce the stagnation zone but also are in a range appropriate for the force of the hollow-fiber membrane 2.

As a result of a steam sterilization test, the minimum temperature reached 121° C. at 5 measurement places within 15 minutes after starting steam supply, and the temperature of 121° C. was maintained for subsequent 20 minutes.

From these results, it can be said that the shape of the channel material 5 of Example 1 can enhance the drain discharge from the liquid-to-be-filtrated inflow port 9 and increase the efficiency of steam sterilization.

Example 2

A hollow-fiber membrane module 100B was prepared in the same manner as in Example 1 except that the lengths of the opening parts 5E in the height direction of all channel materials 5 were 30 mm, and a filtration operation test was performed. At this time, the total area S of the opening parts 5E of the channel materials 5 and the outer diameter R on the second end 1b side of the first binding part 3 were at $S/R^2=0.66$. The increase in weight of the hollow-fiber membrane module 100B due to supply of activated sludge was as small as 3 g (Table 1).

The hollow-fiber membrane module 100B was thereafter disassembled, and the vicinity of the first binding part 3 was observed, as a result, accumulation of a suspended substance was not recognized. This reveals that the hollow-fiber membrane module 100B of this Example caused little stagnation. In addition, a damage, etc. were not recognized in the hollow-fiber membrane 2 when observed, and this reveals that the first binding part 3 and the opening part 5E of the channel material 5 not only have a shape effective to reduce the stagnation zone but also are in a range appropriate for the force of the hollow-fiber membrane 2.

As a result of a steam sterilization test, the minimum temperature reached 121° C. at 5 measurement places within 15 minutes after starting steam supply, and the temperature of 121° C. was maintained for subsequent 20 minutes. From these results, it can be said that the shape of the channel material 5 of Example 2 can enhance the drain discharge from the liquid-to-be-filtrated inflow port 9 and increase the efficiency of steam sterilization.

Comparative Example 1

A filtration operation test was performed in the same manner as in Example 2 except that a hollow-fiber membrane module 100A not having a channel material 5 was used. The weight of the hollow-fiber membrane module 100A was increased by about 26 g due to supply of activated sludge (Table 2). The hollow-fiber membrane module 100A was disassembled and observed, as a result, accumulation of a suspended substance was recognized near the upper end of the first binding part 3. The increase in weight was caused by accumulation of a suspended substance, and this reveals that when a channel material 5 was not provided, severe stagnation occurred in the hollow-fiber membrane module 100A. In addition, a damage, etc. were not recognized in the hollow-fiber membrane 2 when observed. As a result of a steam sterilization test, the minimum temperature reached 121° C. at 5 measurement places within 15 minutes after starting steam supply, and the temperature of 121° C. was maintained for subsequent 20 minutes.

Example 3

A hollow-fiber membrane module 100B was prepared in the same manner as in Example 1 except that the opening parts 5E of all channel materials 5 were provided to start from 10 mm above the end face on the second end 1b side of the first binding part 3. At this time, similarly to Example 1, the total area S of the opening parts 5E of the channel materials 5 and the outer diameter R on the second end 1b side of the first binding part 3 were at $S/R^2=0.022$.

As a result of a filtration operation test, the increase in weight was 18 g (Table 1). The hollow-fiber membrane module was disassembled, and the vicinity of the first binding part 3 was observed, as a result, accumulation of a suspended substance was recognized. The reason therefor is considered to be that since the opening part 5E of the channel material 5 is provided to start from 10 mm above the end face on the second end 1b side of the first binding part 3, stagnation occurred near the end face on the second end 1b side of the first binding part 3 and a suspended substance accumulated. A damage, etc. were not recognized in the hollow-fiber membrane 2 when observed.

In addition, a steam sterilization test was performed in the same manner as in Example 1, as a result, the minimum temperature of the end face on the second end 1b side of the first binding part 3 was 100° C. even 60 minutes after starting steam supply. From these results, it can be said that the shape of the channel material 5 of Example 3 impairs the drain discharge from the liquid-to-be-filtrated inflow port 9 and causes low efficiency of steam sterilization.

Example 4

A hollow-fiber membrane module 100B was prepared in the same manner as in Example 1 except that the lengths of the opening parts 5E in the height direction of all channel materials 5 were 40 mm, and a filtration operation test was performed. At this time, the total area S of the opening parts 5E of the channel materials 5 and the outer diameter R on the second end 1b side of the first binding part 3 were at $S/R^2=0.88$. The increase in weight of the hollow-fiber membrane module 100B due to supply of activated sludge was 12 g (Table 1). The hollow-fiber membrane module 100B was thereafter disassembled, and the vicinity of the first binding part 3 was observed, as a result, accumulation of a suspended substance was almost uniformly recognized. This is considered to occur because the first binding part 3 and the opening part 5E of the channel material 5 did not have a shape effective to reduce the stagnation zone and the flow velocity of fluid flowing out from the channel material 5 was decreased. A damage, etc. were not recognized in the hollow-fiber membrane 2 when observed.

As a result of a steam sterilization test, the minimum temperature reached 121° C. at 5 measurement places within 15 minutes after starting steam supply, and the temperature of 121° C. was maintained for subsequent 20 minutes. From these results, it can be said that the shape of the channel material 5 of Example 4 can enhance the drain discharge from the liquid-to-be-filtrated inflow port 9 and increase the efficiency of steam sterilization.

Example 5

A hollow-fiber membrane module 100B was prepared in the same manner as in Example 1 except that in the opening parts 5E of all channel materials 5, the width of the portion in contact with the surface on the second end 1b side of the first binding part 3 was 2 mm, and a filtration operation test was performed. At this time, the total area S of the opening parts 5E of the channel materials 5 and the outer diameter R on the second end 1b side of the first binding part 3 were at $S/R^2=0.0088$. The increase in weight of the hollow-fiber membrane module 100B due to supply of activated sludge was 11 g (Table 1). The hollow-fiber membrane module 100B was thereafter disassembled, and the vicinity of the first binding part 3 was observed, as a result, accumulation of a suspended substance was recognized in a partially unevenly distributed manner. The increase in weight was caused by accumulation of a suspended substance, and this reveals that the first binding part 3 and the opening part 5E of the channel material 5 did not have a shape effective to reduce the stagnation zone and severe stagnation occurred due to drift in the hollow-fiber membrane module 100A. In addition, a damage was recognized in about 12 hollow-fiber membranes 2 when observed. This reveals that the first binding part 3 and the opening part 5E of the channel material 5 had a shape allowing generation of a flow at an excessive speed in some locations due to drift and were not in a range appropriate for the force of the hollow-fiber membrane 2.

As a result of a steam sterilization test, the minimum temperature reached 121° C. at 5 measurement places in 25 minutes after starting steam supply, and the temperature of 121° C. was maintained for subsequent 20 minutes. From these results, it can be said that the shape of the channel material 5 of Example 5 can somewhat enhance the drain discharge from the liquid-to-be-filtrated inflow port 9 but causes relatively low efficiency of steam sterilization.

Example 6

The same hollow-fiber membrane 2 was obtained except that the hollow-fiber membrane 2 was prepared with an outer diameter of 790 μm and an inner diameter of 470 μm. At this time, the force per membrane was 3.9 N. In addition, a hollow-fiber membrane module 100B was prepared in the same manner as in Example 1 except that 15,200 hollow-fiber membranes 2 obtained above were housed in the cylindrical case 1, and a filtration operation test was performed. At this time, similarly to Example 1, the total area S of the opening parts 5E of the channel materials 5 and the outer diameter R on the second end 1b side of the first binding part 3 were at $S/R^2=0.022$. The increase in weight of the hollow-fiber membrane module 100E due to supply of activated sludge was as small as 3 g (Table 1). The hollow-fiber membrane module 100B was thereafter disassembled, and the vicinity of the first binding part 3 was observed, as a result, accumulation of a suspended substance was not recognized, but a damage was recognized in 34 hollow-fiber membranes 2 when observed. This reveals that the first binding part 3 and the opening part 5E of the channel material 5 had a shape effective to reduce accumulation of a suspended substance but, on the other hand, were not in a range appropriate for the force of the hollow-fiber membrane 2.

As a result of a steam sterilization test, the minimum temperature reached 121° C. at 5 measurement places within 15 minutes after starting steam supply, and the temperature of 121° C. was maintained for subsequent 20 minutes.

Example 7

A hollow-fiber membrane module 100B was prepared in the same manner as in Example 2 except that in the opening parts 5E of all channel materials 5, the width of the portion in contact with the surface on the second end 1b side of the first binding part 3 was 6.5 mm, and a filtration operation test was performed. At this time, the total area S of the opening parts 5E of the channel materials 5 and the outer diameter R on the second end 1b side of the first binding part 3 were at $S/R^2=0.86$. The increase in weight of the hollow-fiber membrane module 100B due to supply of activated sludge was as small as 3 g (Table 1).

The hollow-fiber membrane module 100B was thereafter disassembled, and the vicinity of the first binding part 3 was observed, as a result, accumulation of a suspended substance was not recognized. This reveals that the hollow-fiber membrane module 100B of this Example caused little stagnation. In addition, a damage, etc. were not recognized in the hollow-fiber membrane 2 when observed, and this reveals that the first binding part 3 and the opening part 5E of the channel material 5 not only had a shape effective to reduce the stagnation zone but also were in a range appropriate for the force of the hollow-fiber membrane 2.

As a result of a steam sterilization test, the minimum temperature reached 121° C. at 5 measurement places within 15 minutes after starting steam supply, and the temperature of 121° C. was maintained for subsequent 20 minutes. From these results, it can be said that the shape of the channel material 5 of Example 7 can enhance the drain discharge from the liquid-to-be-filtrated inflow port 9 and increase the efficiency of steam sterilization.

TABLE 1

|  | Change in Weight Between Before Supply of Activated Sludge and After Supply thereof (g) | Presence or Absence of Suspended Substance After Disassembly | Presence or Absence of Damage to Membrane After Disassembly | Steam Sterilization Test |
|---|---|---|---|---|
| Example 1 | 2 | none | none | reached 121° C. within 15 minutes |
| Example 2 | 3 | none | none | reached 121° C. within 15 minutes |
| Example 3 | 18 | present | none | reached 100° C. after 60 minutes |
| Example 4 | 12 | present | none | reached 121° C. within 15 minutes |
| Example 5 | 11 | present | present | reached 121° C. after 25 minutes |
| Example 6 | 3 | none | present | reached 121° C. within 15 minutes |
| Example 7 | 3 | none | none | reached 121° C. within 15 minutes |
| Comparative Example 1 | 26 | present | none | reached 121° C. within 15 minutes |

This application is based on Japanese Patent Application No. 2014-177422 filed on Sep. 1, 2014, the contents of which are incorporated herein by reference.

INDUSTRIAL APPLICABILITY

The hollow-fiber membrane module according to the present invention can be used in the fields of fermentation industry, production of medicines, food industry, water treatment, etc. In particular, even when liquid containing many suspended substances is filtrated in the hollow-fiber membrane module according to the present invention, the accumulation amount of a suspended substance can be reduced, and filtration can be stably performed for a long period of time. In addition, contamination with bacteria can be prevented and therefore, the hollow-fiber membrane module can be suitably applied to the fields of fermentation industry, production of medicines, food industry, water treatment, etc.

DESCRIPTION OF REFERENCE NUMERALS AND SIGNS

100A Hollow-fiber membrane module
100B Hollow-fiber membrane module
1 Cylindrical case
1D Flange
1E Flange
2 Hollow-fiber membrane
3 First binding part
4 First flow channel
4A Through hole
4B Clearance
5 Channel material
5A Baffle-like channel material
5B Spherical channel material
5C Channel material having a planar tip
5D Channel material having a dome-shaped tip
5E Opening part
6 Upper cap
7 Lower cap
8 Filtrated liquid outlet
9 Liquid-to-be-filtrated inflow port
10 Gasket
11 Liquid-to-be-filtrated outlet (nozzle)
12 Hollow-fiber membrane bundle
13 Second binding part
14 Flow regulation hole
15 Flow regulation cylinder
16 First binding part case
17 Jig for forming second binding part
18 Pin
19 Jig for forming first binding part
P Place susceptible to accumulation of a suspended substance, etc. (stagnation zone)

The invention claimed is:

1. A hollow-fiber membrane module comprising:
a cylindrical case having a first end and a second end in a height direction thereof;
a hollow-fiber membrane bundle being housed in the cylindrical case and having a plurality of hollow-fiber membranes each closed at an end part on the first end side and opened at an end part on the second end side;
a first binding part binding the end parts on the first end side of the hollow-fiber membranes;
a first flow channel guiding fluid to pass through the first binding part from the first end side to the second end side of the first binding part; and
a channel material directing, at a terminal on the second end side of the first flow channel, a flow of at least a part of the fluid flowing out from the terminal on the second end side of the first flow channel toward a direction intersecting the height direction of the cylindrical case, the channel material protrudes from an end face on a second end side of the first binding part and has an opening part in contact with a surface on the second end side of the first binding part wherein an outer diameter R of the first binding part and a total area S of the opening part of the channel material satisfies 0.004≤S/R2≤1.2.

2. The hollow-fiber membrane module according to claim 1, wherein:
a length of the opening part in the height direction of the at least one of the channel materials is from 1 mm to 30 mm.

3. The hollow-fiber membrane module according to claim 1, wherein:
a breaking force F of the hollow-fiber membrane satisfies F≥4.9 N.

4. The hollow-fiber membrane module according to claim 1, wherein:
the end face on the second end side of the first binding part has an A hardness of 10 or more and a D hardness of less than 85.

5. The hollow-fiber membrane module according to claim 1, wherein:
the terminal of at least one of the first flow channels is arranged in an area within a height of 3 mm from the lowest region in the end face on the second end side of the first binding part.

6. The hollow-fiber membrane module according to claim 1, wherein:
a total area of the first flow channels in a cross-section perpendicular to the height direction is from 2 to 35% relative to an area on an inner side of the cylindrical case in the cross-section perpendicular to the height direction, including the first binding part.

7. The hollow-fiber membrane module according to claim 1, wherein:
the hollow-fiber membrane module has a plurality of the first flow channels, the channel material is arranged to change a flow direction of the fluid flowing out from a part of flow channels among the plurality of the first flow channels, and in the cross-section perpendicular to the height direction, an area of, among the first flow channels, a flow channel supplying a flow in a direction to be changed by the channel material is from 30 to 90% relative to the total area of the first flow channels.

8. A method for producing a hollow-fiber membrane module, the hollow-fiber module comprising
a cylindrical case having a first end and a second end in a height direction thereof; a hollow-fiber membrane bundle being housed in the cylindrical case and having a plurality of hollow-fiber membranes each closed at an end part on the first end side and opened at an end part on the second end side;
a first binding part binding the end parts on the first end side of the hollow-fiber membranes;
a first flow channel guiding fluid to pass through the first binding part from the first end side to the second end side of the first binding part; and
a channel material directing, at a terminal on the second end side of the first flow channel, a flow of at least a part of the fluid flowing out from the terminal on the second end side of the first flow channel toward a direction intersecting the height direction of the cylindrical case, the channel material protrudes from an end face on a second end side of the first binding part and has an opening part in contact with a surface on the second end side of the first binding part wherein an outer diameter R of the first binding part and a total area S of the opening part of the channel material satisfies 0.004≤S/R2≤1.2, the method for producing comprising the following steps (a) to (e):
(a) a step of disposing the channel material at least at one end part of the hollow-fiber membrane bundle having the plurality of hollow-fiber membranes;
(b) a step of disposing a flow channel-forming jig in a portion to be a flow channel of the channel material;
(c) a step of disposing a potting jig to surround at least the end part on which the channel material is arranged, of the hollow-fiber membrane bundle having the plurality of hollow-fiber membranes;
(d) a step of curing a potting agent in the potting jig to form a binding part in which bonding/fixing between the hollow-fiber membranes and of the channel material is completed; and
(e) a step of removing the flow channel-forming jig and the potting jig.

9. A method for producing a hollow-fiber membrane module, the hollow-fiber module comprising
a cylindrical case having a first end and a second end in a height direction thereof; a hollow-fiber membrane bundle being housed in the cylindrical case and having a plurality of hollow-fiber membranes each closed at an end part on the first end side and opened at an end part on the second end side;
a first binding part binding the end parts on the first end side of the hollow-fiber membranes;
a first flow channel guiding fluid to pass through the first binding part from the first end side to the second end side of the first binding part; and
a channel material directing, at a terminal on the second end side of the first flow channel, a flow of at least a part of the fluid flowing out from the terminal on the second end side of the first flow channel toward a direction intersecting the height direction of the cylindrical case, the channel material protrudes from an end face on a second end side of the first binding part and has an opening part in contact with a surface on the second end side of the first binding part wherein an outer diameter R of the first binding part and a total area S of the opening part of the channel material satisfies 0.004≤S/R2≤1.2, the method for producing comprising the following steps (a) to (d):
(a) a step of disposing a potting jig to surround at least one end part of the hollow-fiber membrane bundle having the plurality of hollow-fiber membranes;
(b) a step of curing a potting agent in the potting jig to form a binding part in which bonding/fixing between the hollow-fiber membranes is completed;
(c) a step of removing the potting jig; and
(d) a step of fixing the channel material to the binding part.

* * * * *